United States Patent Office 2,741,551
Patented Apr. 10, 1956

2,741,551

METHOD OF PREPARING A SOIL CONDITIONING AND ENRICHING COMPOSITION

Gordon A. Daline, Excelsior, Minn.

No Drawing. Application October 16, 1952,
Serial No. 315,207

1 Claim. (Cl. 71—64)

This invention relates to a prepared composition of uniform, granular form adapted to be readily distributed by hand or with fertilizer cart for both enriching and conditioning the soil to materially improve seed germination, grain yield, aeration and increased water-holding capacity.

The use of hydrolyzed polyacrylonitrile has produced astounding results in transforming many unproductive soils into fertile land. This chemical applied to merely the top surface of soil after moistening, causes clay and other soil particles to be agglomerated and very loosely bound together into porous clods. The new soil conditioning chemical possesses elongated molecules which according to the best authorities when moistened, form a gum which causes such agglomeration.

Said soil conditioner hydrolyzed polyacrylonitrile possesses no fertilizing or soil enrichment factors. It is of high potency and extremely fine granulation and therefore, is somewhat difficult to apply and distribute economically. It is estimated that worked into the top three inches of soil, even at its lowest claimed concentration, two hundred pounds of this soil conditioner are required per acre which of course makes it almost prohibitive for large scale farming and quite expensive even for home gardens, lawns and greenhouses.

It is an object of my invention to provide a highly efficient, economical composition for combinatively conditioning and fertilizing soil which may be commercially produced, packaged and readily and uniformly distributed to produce soil conditions most productive for the growing of crops, gardens, vegetables and grass. This object is attained by the utilization of a commercially granular soil fertilizer such as soy bean meal which is commercially available in substantially a uniform particle size, in a dual capacity first to provide soil enrichment and second, to act as a carrier vehicle to retain and distribute substantially predetermined quantities of the commercially obtainable soil conditioner.

Another object is the provision of a substantially uniform, granular composition containing hydrolyzed polyacrylonitrile soil conditioner and a granular soil enriching ingredient such as soy bean oil and meal wherein the ingredients will not shift or settle in the package but will retain the original homogeneous relation during transportation and upon the shelf and when the material is distributed by hand or by conventional fertilizer distributing implements.

More specifically, it is an object to provide a composition of the class described wherein hydrolyzed polyacrylonitrile in its commercial pulverized and available state, is intimately admixed with an adhered to a compatible granular soil fertilizer or enricher and remains bonded thereto during packaging, transportation and subsequent distribution to uniformly spread and dilute the important soil-conditioning product and to produce a resultant effect of clod-like, moisture-absorbing agglomeration with provision of soil-enrichment to the top stratum of a piece of a garden, lawn or the like.

Another and important object of the invention is the provision of a simple, economical and commercial method of producing and preparing my said composition.

Exhaustive experimentation has disclosed that dry, pulverized hydrolyzed polyacrylonitrile which is mildly hydroscopic in nature may be adhered and bonded to coarse, granular particles of soil-enriching material, particularly soy bean meal, without loss of its soil-conditioning characteristics and with enhancement of the soil-enriching characteristics of the soy bean meal to which it is bonded.

I prefer to utilize in addition to quantities of pulverized, dry hydrolyzed polyacrylonitrile and soy bean meal an adhesive in dry, pulverized state which is compatible with the soy bean meal and will serve to substantially assist in the adhesion of the hydrolyzed polyacrylonitrile without requirement of moisture or wetting to a state which will convert the hydrolyzed polyacrylonitrile to a gum.

While proportions may be substantially varied and other cereal or vegetable water-dilutable adhesives utilized I have obtained highly efficient results with a mixture of twenty pounds of hydrolyzed polyacrylonitrile with ten pounds of a pulverized dry adhesive such as the natural adhesive commercially obtained from soy beans or dextrin, said ingredients in such preparations being intimately admixed with a full ton of granulated, dry soy bean meal. Such adhesive is water soluble.

In the production or preparation of my composition, it is important that a predetermined method be carried out to secure successful results. To this end, the dry, powdered hydrolyzed polyacrylonitrile and the pulverized adhesive in dry state and in somewhat equal proportions by weight, are first intimately admixed. Thereafter, the resultant mixture is intimately admixed by mechanical mixing and agitation with approximately from eighty to one hundred times the proportion by weight of the said granulated dry soy bean meal. After thorough admixture of the dry ingredients, the mass in agitation is sprayed with a very fine spray of water, agitation and further mixing being continued during such spraying. About 100 pounds of water to a ton of mixture is satisfactory.

The resultant moistened mass is then dried by dry heat to a point where the moisture content of the product is in a range preferably between 3% and 5% by weight.

The resultant product is in granular and slightly agglomerated form, the average size of the granular particles being slightly larger than the original particles of soy bean meal. The product is brownish gray in color, is in substantially dry state and may be poured successfully or handled in conveyors for the filling of packages. No visible traces of the light yellow pulverized hydrolyzed polyacrylonitrile appear upon the product but this pulverized chemical partially surrounds and has been bonded to the individual soy bean meal particles through its own inherent characteristics and particularly through the pulverized adhesive which acts as a bonding agent and also in a measure to encyst and help preserve the constituency of the hydrolyzed polyacrylonitrile.

My product thus prepared in substantially dry state may be readily packaged in cartons, bags or other containers and will readily flow in granular form to facilitate distribution by hand or with fertilizer-distributing implements.

In use, one pound of my improved composition will successfully treat approximately 200 square feet of soil to a depth of one half inch. This depth is sufficient for all gardening or greenhouse purposes as well as for building or rebuilding lawns. It is the top fragment of the soil surface which usually crusts and cakes, interfering with plant break-through and causing water to run off and reducing collection of moisture.

After my composition is applied to the soil, it should be watered. The chemical hydrolyzed polyacrylonitrile dissolves and takes immediate effect. The fertilizing action of the soy bean meal lasts for several years.

With my composition, intensive concentration of the hydrolyzed polyacrylonitrile in application is prevented and a substantially uniform and desired distribution of this important chemical is obtained with attendant dilution of the chemical and provision of soil enriching ingredients at the points of application of the chemical hydrolyzed polyacrylonitrile.

The soy bean cake particles therefore not only supply essential soil enriching ingredients but further act as the medium or carrier for adequately collecting, packaging and distributing the vital soil building chemical. In this connection, it is important that a fertilizer having compatibility with the chemical be utilized as well as a fertilizer which commerically is attainable in small but desirable granular size. It is further important that a bonding ingredient or adhesive be used which is compatible with and will not destroy the effectiveness of either of the two principal ingredients.

My improved composition and method contemplates within the scope of this invention, the enhancement of the nitrogen content of the soy bean meal through addition of urea thereto where the prepared product is to be utilized for soils of very low fertility.

In this connection, the urea in powdered or small granular form, is mixed intimately with the dry, hydrolyzed polyacrylonitrile and the pulverized adhesive in dry state and thereafter, that mixture is intimately admixed by mechanical agitation with the proposed range of the dry soy bean meal or the equivalent with the addition of fine water spray during agitation and mixing.

From the foregoing description, it will be clear that I have provided a new composition particularly well adapted for accurate and economical commercialization and which composition is adapted to quite uniformly distribute soil-enriching and soil-conditioning ingredients.

It will further be seen that my invention includes a new and thoroughly practical method for manufacturing on a commercial scale of my improved composition.

It will of course be understood that my invention is applicable to the preparation and manufacture of a limited range of equivalent compositions where soy bean meal may be desirably encysted and bonded to compatible, dry, pulverized material for uniformly distributing and retaining the pulverized ingredients in ultimate use.

What I claim is:

Method of preparing an agglomerative fertilizing and soil-conditioning composition adapted for package transportation and substantially uniform soil distribution which consists in first intimately admixing pulverized, hydrolyzed polyacrylonitrile with a pulverized, dry, organic water-soluble adhesive to a point where said polyacrylonitrile is substantially encysted with said adhesive and thereafter admixing said first mixture with a relatively large quantity of granular, dry soy bean meal and simultaneously with said admixing, applying a restricted quantity of finely sprayed moisture during admixture to the particles to form substantial agglomerates which include said polyacrylonitrile and said soy bean meal particles.

References Cited in the file of this patent

UNITED STATES PATENTS

| | | |
|---|---|---|
| 1,978,102 | Clapp | Oct. 23, 1934 |
| 2,341,800 | Martin et al. | Feb. 15, 1944 |
| 2,625,471 | Mowry et al. | Jan. 13, 1953 |
| 2,625,529 | Hedrick et al. | Jan. 13, 1953 |

FOREIGN PATENTS

| | | |
|---|---|---|
| 348,184 | Great Britain | May 8, 1931 |